United States Patent
Nakao

(10) Patent No.: US 11,137,952 B2
(45) Date of Patent: Oct. 5, 2021

(54) IMAGE FORMING APPARATUS, INFORMATION PROCESSING METHOD, AND PROGRAM

(71) Applicant: Yuuya Nakao, Kanagawa (JP)

(72) Inventor: Yuuya Nakao, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/744,466

(22) Filed: Jan. 16, 2020

(65) Prior Publication Data

US 2020/0233614 A1 Jul. 23, 2020

(30) Foreign Application Priority Data

Jan. 18, 2019 (JP) .............................. JP2019-007336

(51) Int. Cl.
*H04N 1/00* (2006.01)
*G06F 3/12* (2006.01)

(52) U.S. Cl.
CPC ............ *G06F 3/121* (2013.01); *G06F 3/1234* (2013.01); *G06F 3/1256* (2013.01)

(58) Field of Classification Search
CPC ...... G06F 3/121; G06F 3/1234; G06F 3/1256; H04N 1/00029; H04N 1/00084; H04N 1/32609; H04N 1/32614; H04N 1/32619; H04N 1/32641; H04N 1/32651; H04N 1/32667
USPC ................................. 358/1.11–1.18, 406, 504
See application file for complete search history.

(56) References Cited

U.S. PATENT DOCUMENTS

| | | | |
|---|---|---|---|
| 2002/0194553 A1* | 12/2002 | Okamoto | H04N 1/32662 714/699 |
| 2011/0060584 A1* | 3/2011 | Ferrucci | G06F 40/232 704/9 |
| 2017/0308337 A1* | 10/2017 | Yanagi | G06F 3/1285 |
| 2018/0063367 A1* | 3/2018 | Kitayama | G03G 15/5087 |
| 2018/0088883 A1 | 3/2018 | Hashimoto | |

FOREIGN PATENT DOCUMENTS

| | | |
|---|---|---|
| JP | 2010-200007 | 9/2010 |
| JP | 2010200007 A * | 9/2010 |
| JP | 2016-127302 | 7/2016 |
| JP | 2018-058341 | 4/2018 |

* cited by examiner

*Primary Examiner* — Chad Dickerson
(74) *Attorney, Agent, or Firm* — IPUSA, PLLC

(57) ABSTRACT

An image forming apparatus includes an operation device that is connected to the image forming apparatus and receives an operation to the image forming apparatus; a processing unit that performs a predetermined processing by a first application in the image forming apparatus or the operation device; an error detecting unit that detects the error in the processing by the first application; a control unit that starts up a second application to resolve the error upon the error is detected; a transmission unit that transmits error data formed based on the contents of the error from the first application to the second application; and a display unit that displays the operation screen of the second application based on the error data.

18 Claims, 16 Drawing Sheets

FIG.10

| COPIER | SCANNER | FACSIMILE | | PN2 |

FOLDER: AAAA

PROTOCOL: SMB (TRANSMIT TO SHARED FOLDER OF PC)

WHEN COMPUTER NAME OR IP ADDRESS ARE INPUT, SHARED FOLDER CAN BE SELECTED FROM "REFERENCE TO NETWORK".

PATH NAME
*REQUIRED ITEM

¥¥aa¥a  ⟨6/256⟩

REFERENCE TO NETWORK

FOLDER AUTHENTICATION INFORMATION: DESIGNATE OTHER AUTHENTICATION INFORMATION

LOGIN USER NAME: a

CANCEL  OK

| COPIER | SCANNER | FACSIMILE |

FOLDER: AAAA

PN3

FOLDER AUTHENTICATION INFORMATION — DESIGNATE OTHER AUTHENTICATION INFORMATION

REFERENCE TO NETWORK

LOGIN USER NAME: a  ⟨1/64⟩

LOGIN PASSWORD: .  ⟨1/64⟩

CONNECTION TEST

CANCEL    OK

2018/12/20 14:56

IMAGE FORMING APPARATUS, INFORMATION PROCESSING METHOD, AND PROGRAM

CROSS-REFERENCE TO RELATED APPLICATIONS

This application is based on and claims priority to Japanese Patent Application No. 2019-007336, filed on Jan. 18, 2019, the entire contents of which are incorporated herein by reference.

BACKGROUND OF THE INVENTION

1. Field of the Invention

The present invention relates to an image forming apparatus, an information processing method, and a program.

2. Description of the Related Art

In an image forming apparatus, a method of executing an application is known.

When an error occurs in a predetermined process performed by the image forming apparatus, an error screen including an error message is displayed, and a screen in which a set value is changed to resolve the error is displayed in accordance with the user's operation of the error screen. In this manner, a method of eliminating an error by a user changing a set value is known (see, for example, Patent Document 1).

[Patent Document 1]
Japanese Laid-Open Patent Application No. 2010-200007

However, in this method, if the application that generates the error is different from the application that resolved the error, the contents of the error are often not passed on to the application that resolved the error. Therefore, when an error occurs, for example, the user starts an application that is used to resolve the error. Because of this, users may find the process troublesome.

One aspect of the invention is intended to reduce the inconvenience to the user in resolving an error.

SUMMARY OF THE INVENTION

An image forming apparatus includes an operation device that is connected to an image forming apparatus and receives an operation to the image forming apparatus, a processing unit that performs a predetermined processing by a first application in the image forming apparatus or the operation device, an error detecting unit that detects the error in the processing by the first application, a control unit that starts up a second application to resolve the error upon the error is detected, a transmission unit that transmits error data formed based on the contents of the error from the first application to the second application, and a display unit that displays the operation screen of the second application based on the error data.

BRIEF DESCRIPTION OF THE DRAWINGS

FIG. 10 is a diagram illustrating an operation screen.

FIG. 11 is a diagram illustrating another example of the operation screen.

DETAILED DESCRIPTION OF THE PREFERRED EMBODIMENTS

A description is given below, with reference to the FIG. 1 through FIG. 16 of embodiments of the present invention. Where the same reference symbols are attached to the same parts, repeated description of the parts is omitted.

Reference symbols typically designate as follows:
100: image forming apparatus
110: operation device
500: image forming system
100F1: processing unit
100F2: error detection unit
100F3: control
100F4: transmission unit
100F5: display
DE: error data

First Embodiment

<Example of Image Forming Apparatus>

Figure 1:
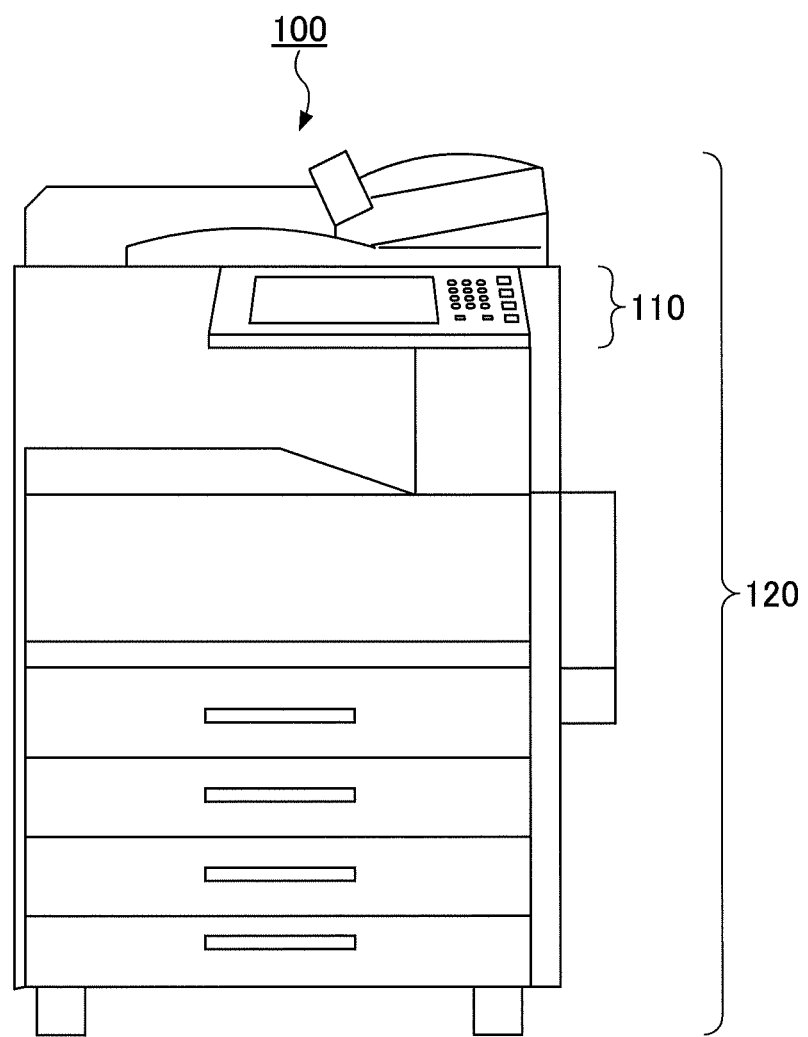
FIG. 1 is a schematic diagram illustrating an overall configuration example of an image forming apparatus.

FIG. 1 is a schematic diagram illustrating an overall configuration example of an image forming apparatus. As illustrated, the image forming apparatus 100 is, for example, an MFP (Multifunction Peripheral). For example, the image forming apparatus 100 includes an image processing function such as a copy function, a scanner function, a facsimile function, and a printer function. The image forming apparatus 100 may further have other functions (for example, an error display function).

In this example, the image forming apparatus 100 includes an operation device 110. On the other hand, the image forming apparatus 100 has a configuration other than the operation device 110 (hereinafter, referred to as the "main body unit 120").

For the operation device 110, a user inputs various operations for the image forming apparatus 100. The image forming apparatus 100 performs image processing based on an operation by the operation device 110 and the main body unit 120.

<Example of Hardware Configuration>

Figure 2:
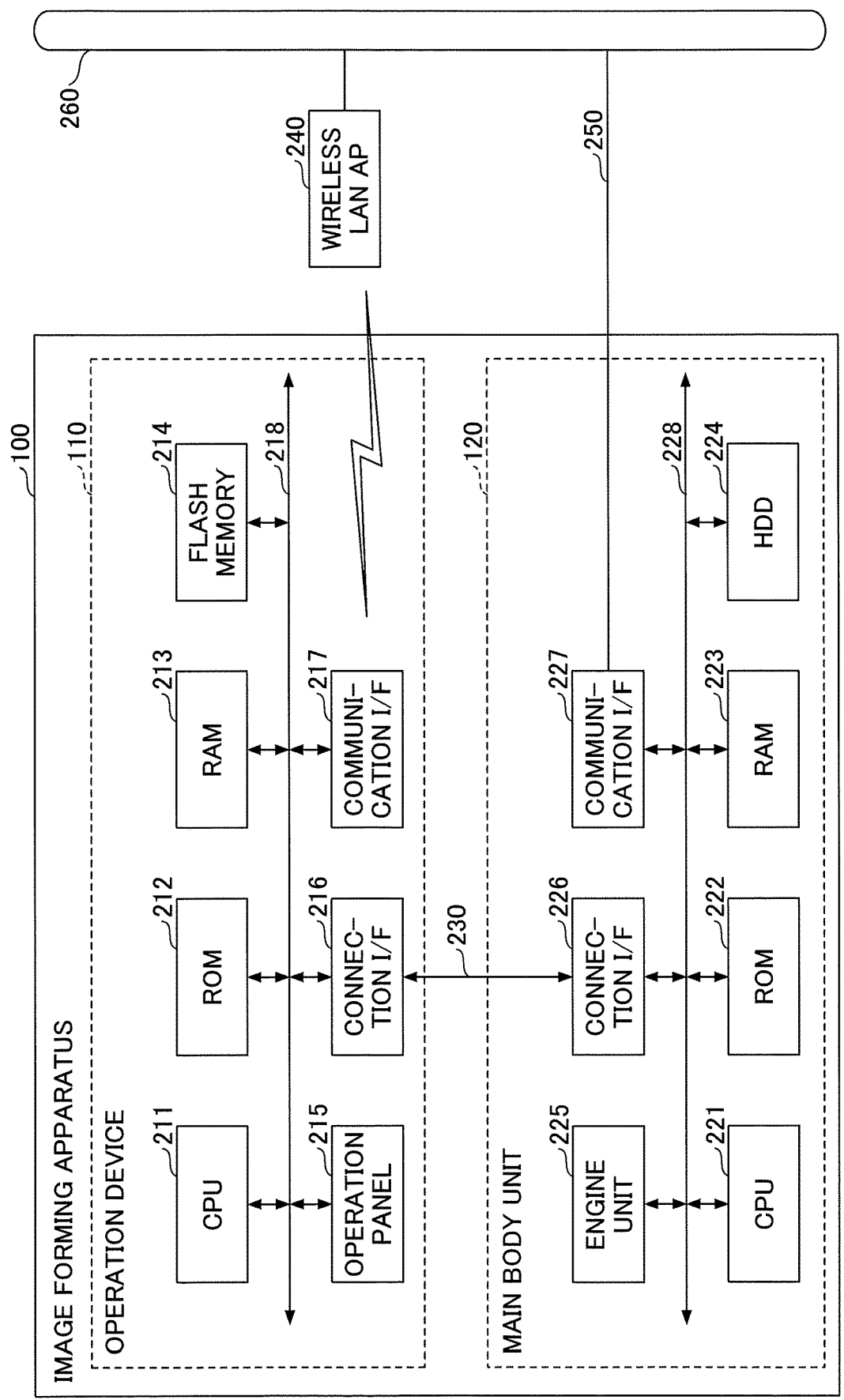
FIG. 2 is a block diagram illustrating an example of a hardware configuration of an operation device and main body unit.

FIG. 2 is a block diagram illustrating an example of a hardware configuration of an operation device and a main body unit. First, the operation device 110 is a device having a hardware configuration that includes, for example, a CPU (Central Processing Unit, hereinafter referred to as "CPU 211"), ROM (Read-Only Memory; hereinafter referred to as "ROM 212"), RAM (Random Access Memory; hereinafter referred to as "RAM 213"), flash memory 214, operation panel 215, connection interface (hereinafter referred to as "connection I/F 216"), and communication interface (hereinafter referred to as "communication I/F 217").

As also illustrated, these hardware resources are interconnected by a bus 218.

The CPU 211 is an example of an arithmetic unit and a control unit. The CPU 211 executes various programs stored in the ROM 212 or the flash memory 214 using the main storage device such as the RAM 213 as the work area. Through such control and calculation, the CPU 211 controls the operation device 110 and provides various functions.

The flash memory 214 is an example of a non-volatile memory medium. For example, the flash memory 214 stores programs and data, etc.

The operation panel 215 is an example of an input device and an output device. That is, the operation panel 215 displays the operation screen and the processing results. On the other hand, the operation panel 215 accepts an operation by a user.

The connection I/F 216 is an interface for communicating with the main body unit 120 through the communication channel 230. For example, the connection I/F 216 includes a connector and a cable, etc. Specifically, the connection I/F 216 communicates using a USB (Universal Serial Bus), etc.

The communication I/F 217 is an interface that communicates with an external device via a network 260. For example, the communication I/F 217 may be an antenna or the like. In the example illustrated in the figure, the communication I/F 217 connects to the wireless LAN (local area network) AP (access point) (hereinafter referred to as "wireless LANAP 240") and performs communication.

The main body unit 120 is a device having a hardware configuration having, for example, a CPU 221, a ROM 222, a RAM 223, an HDD (hard disk drive, hereinafter referred to as "HDD 224"), an engine unit 225, a connection I/F 226, and a communication I/F 227.

As also illustrated, these hardware resources are interconnected by a bus 228.

The CPU 221 is an example of a computing device and a control device. That is, as illustrated in the figures, the computing device and the control device for the main body unit 120 preferably have a hardware configuration that is separate from the CPU 211 for the operation device 110.

The ROM 222 and the RAM 223 are examples of storage devices for the main body unit 120, similar to the CPU 221. Accordingly, the CPU 221 performs processing based on a program stored in an auxiliary memory device such as the ROM 222 and the HDD 224 by using a main memory device such as the RAM 223.

The engine unit 225 is a processing device or the like for implementing image processing functions such as a copy function, a scanner function, a facsimile function, and a printer function. Specifically, the engine unit 225 is, for example, an integrated circuit (IC) or the like. Specifically, the engine unit 225 may include a scanner for scanning and reading an original manuscript, a plotter for printing onto a sheet material such as paper, a communication unit for performing facsimile communication, or a combination thereof. The engine unit 225 may include a device for sorting the printed sheet material, a so-called finisher or an ADF (Auto original manuscript Feeder) for automatically feeding the original manuscript, or the like.

The connection I/F 226 is an interface for communicating with the operation device 110 through the includes a connector and a cable, etc. Specifically, the connection I/F 226 performs communication with a USB or the like.

The communication I/F 227 is an interface that communicates with an external device via the network 260. For example, communication I/F 227 is a cable 250 or the like.

<Example of Operation Device>

Figure 3:
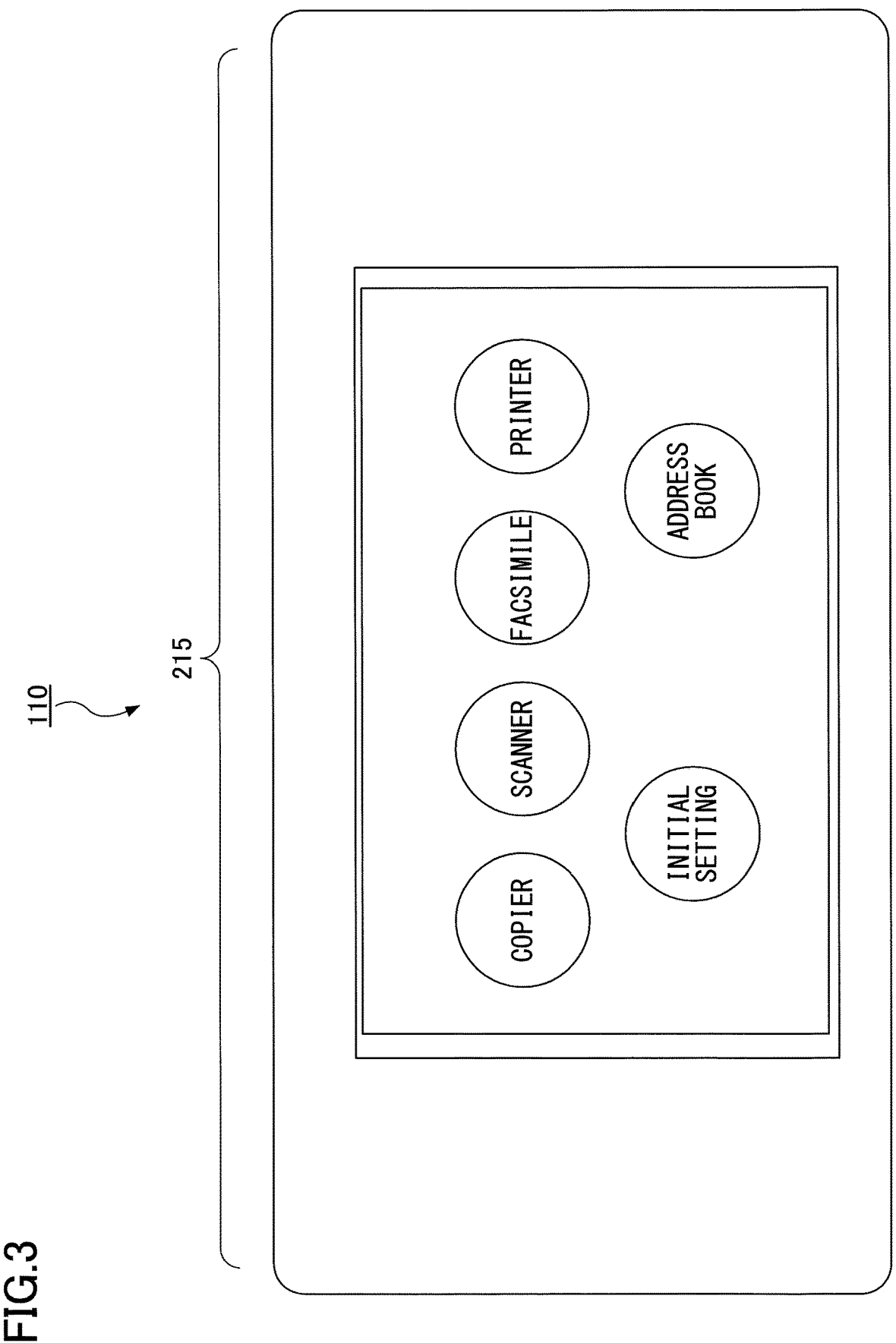
FIG. 3 is a schematic diagram illustrating an external view of an operation device.

FIG. 3 is a schematic diagram illustrating an external view of the operation device. For example, the operation device 110 has an appearance as illustrated. Specifically, the operation device 110 displays the operation screen of various functions provided by the image forming apparatus by, for example, the operation panel 215.

In this example, the operation screen accepts operations for the functions of "copy", "scanner," "fax", and "printer". The example illustrated in the figure is a so-called top screen. For example, when the button "Copy" is depressed, the operation screen displays an operation screen for performing the detailed setting of the function of "Copy."

Further, the example illustrated in the figure is an example of a configuration in which "initial setting" and "address book" may also be set.

When the button is depressed on the operation screen, the screen displayed in the next transition or the set value for performing the setting is set by the menu configuration.

When the button of "initial setting" button is depressed, an operation screen on which various initial settings can be performed is displayed on the operation device and the image forming apparatus.

In the default setting, for example, the communication relationship is set.

When the "Address Book" button is depressed, the data for storing the addresses referenced by various applications, i.e., the operation screen for editing the address book, is displayed.

The operation device 110 is not limited to the operation panel 215 illustrated in the figure.

For example, the operation panel 215 may include a hard key or the like in addition to a touch panel.

That is, the configuration that serves as an interface for manipulating the operation screen may be one other than that illustrated in the figure.

<Example of Software Configuration of Control Unit and Main Body Unit>

Figure 4:
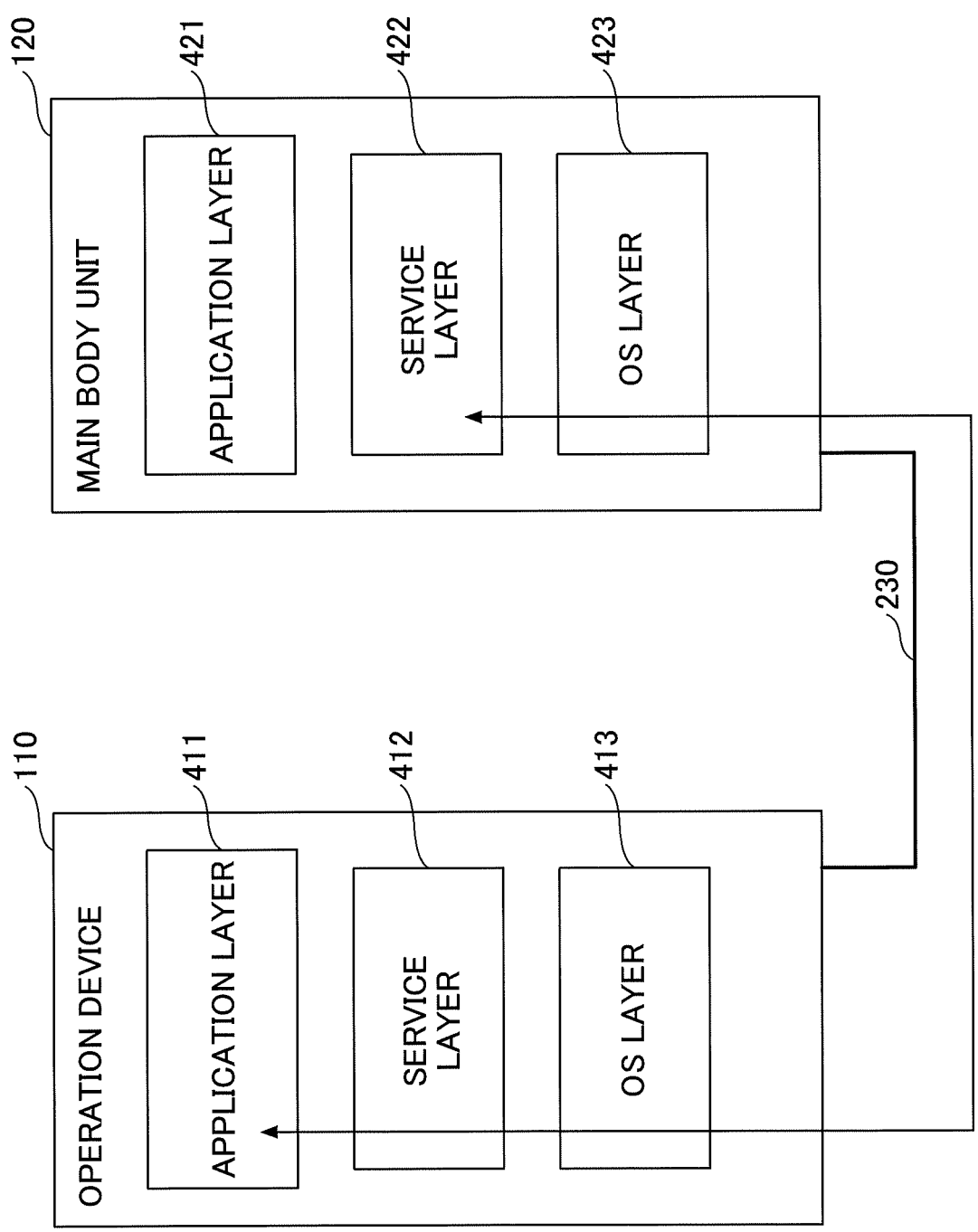
FIG. 4 is a block diagram illustrating an example of a software configuration of an operation device and main body unit.

FIG. 4 is a block diagram illustrating an example of a software configuration of an operation device and a main body unit. The illustrated example illustrates a hierarchical structure of software comprising a program installed in the operation device 110 and the main body unit 120.

First, the main body unit 120 will be described. In this example, a program for constructing, for example, the application layer 421, the service layer 422, and the OS layer (Operating system layer, hereinafter referred to as the "OS layer 423") is installed in the main body unit 120 as an auxiliary memory device.

The program distinguished by the application layer 421 operates the hardware resources of the image forming apparatus 100 to substantialize various functions. Specifically, the programs distinguished by application layer 411 are, for example, copy applications, facsimile applications, scanner applications, and printer applications.

The program divided into the service layer 422 is a program interposed between the application layer 421 and the OS layer 423. For example, the program classified into the service layer 422 implements an interface or the like in which the program of the application layer 421 utilizes the hardware resources possessed by the main body unit 120 or notifies the application layer 421 of the state of the hardware resources possessed by the main body unit 120.

The program categorized in the service layer 422 receives an operation request for the hardware resources or arbitrates the received operation request. Alternatively, the program categorized as the service layer 422 transmits errors detected in the hardware resources as error notifications to the application layer 421. The operation request received by the service layer 422 includes an operation request, for example, reading by a scanner or printing by a plotter.

The role of the interface substantialized by the program classified in the service layer 422 is the same for the application layer 411 of the operation device 110. That is, the program classified into the application layer 411 of the operation device 110 can access the service layer 422 to operate the hardware resources of the main body unit 120 and implement the image processing function or the like.

The program classified into the OS layer 423 is a program called basic software or the like. The program classified into the OS layer 423 provides a basic function for controlling the hardware resources provided by the main body unit 120. First, the program classified into the service layer 422 converts the operation request for the hardware resource emitted by the program classified into the application layer 421 into a command that can be interpreted by the OS layer 423 and passes the request to the OS layer 423. Then, the program classified into the OS layer 423 executes the command, and the image processing function is substantialized based on the operation request for the hardware resource. The hardware resource also receives a sensed error when a program classified as OS layer 423 is executed. The hardware resource then passes the received error notification to the service layer 422 that transmits to the application layer 421.

Next, the operation device 110 is described. In this example, a program for implementing the application layer 411, the service layer 412, and the OS layer 413 is installed in an auxiliary memory device as the operation device 110.

However, the functions substantialized by the program classified into the application layer 411 and the types of operation requests that the service layer 412 can receive are different from those of the main body unit 120. Specifically, in the operation device 110, the program classified into the application layer 411 provides a user interface function for performing an operation and display of the image processing function substantialized mainly by the main body unit 120.

In this example, the operation device 110 and the main body unit 120 operate independently. Further, if the operation device 110 and the main body unit 120 are capable of communicating with each other, each OS may be of different types. For example, the operation device 110 may use Android ("Android" is a registered trademark), and the body unit 120 may use Linux ("Linux" is a registered trademark), etc.

As described above, in the image forming apparatus 100, for example, the operation device 110 and the main body unit 120 are respectively controlled by different OSs. Therefore, communication between the operation device 110 and the main body unit 120 is not communication between processes in one device, but communication between different devices. For example, communication is a command communication in which an operation by a user received by the operation device 110 is transmitted to the main body unit 120, or an event communication in which the main body unit 120 instructs the display screen to be displayed on the operation device 110 (for example, an error notification or an error cancellation notification, or the like).

<Example of System Configuration>

For example, the image forming apparatus 100 comprises an image forming system 500 as follows.

Figure 5:
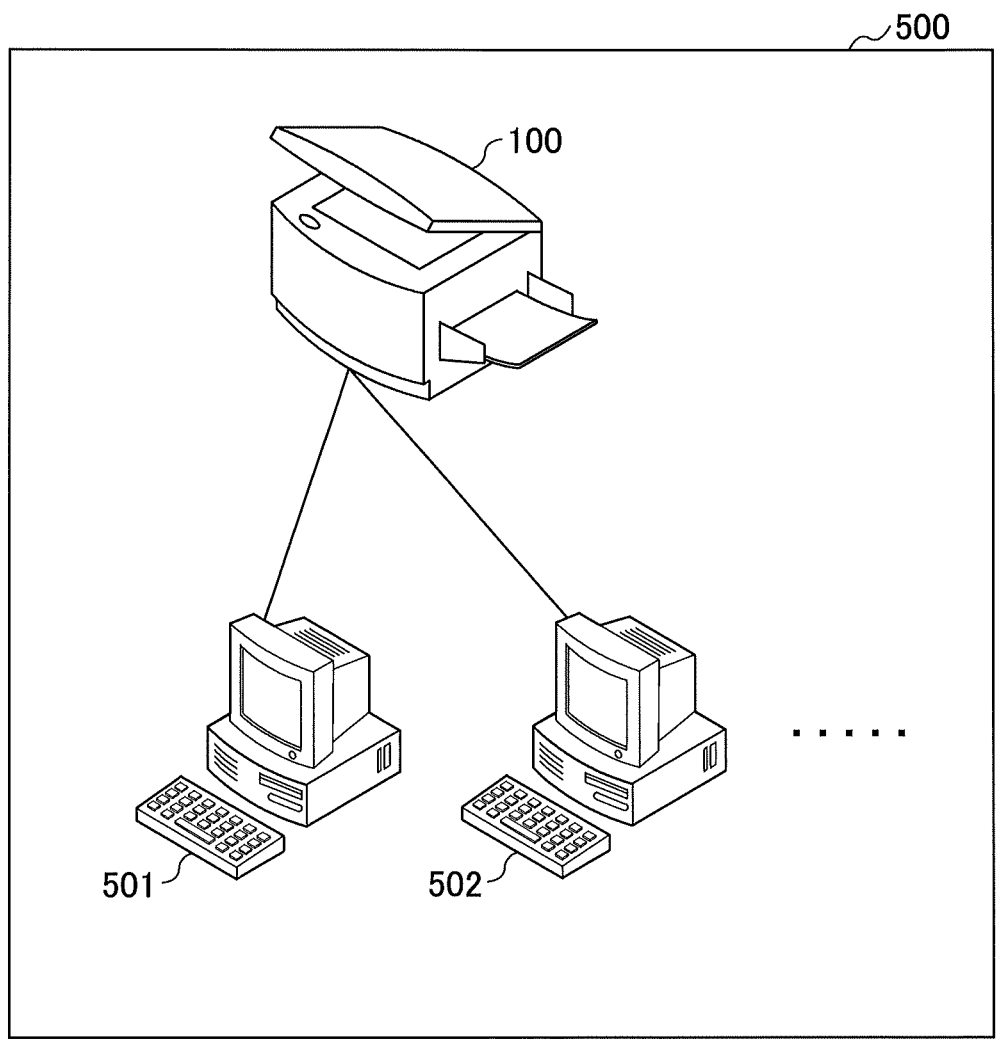
FIG. 5 is a system diagram illustrating an example of a system configuration.

FIG. 5 is a system diagram illustrating an example of a system configuration. For example, the image forming system 500 is a system having a PC (a personal computer, hereinafter referred to as "PC 501" and "PC 501") connected by the network and the image forming apparatus 100.

For example, in the image forming system 500, the image forming apparatus 100 connects to the PC 501 and the PC 502 through a network or a cable.

In the image forming system 500, for example, when an instruction for printing and image data are received from the PCs 501 and 502, the image forming apparatus 100 prints them on a recording medium such as a paper. Further, in the image forming system 500, for example, the image forming apparatus 100 transmits image data generated in the scanner processing to the PC 501 and the PC 502.

The processing and data transmission/reception performed by the image forming system 500 can be changed or added by an application installed in the image forming apparatus 100, the PC 501, and the PC 502.

Further, the information processing apparatus included in the image forming system 500 may not have the configuration and the number of units illustrated in the figures. That is, the image forming system 500 may have one information processing apparatus or may have three or more apparatuses. The image forming system 500 may be configured to include a server and a communication device.

Hereinafter, an example is described in which the image forming apparatus 100 and the PC 501 have the following application configuration in the illustrated configuration.

Figure 6:
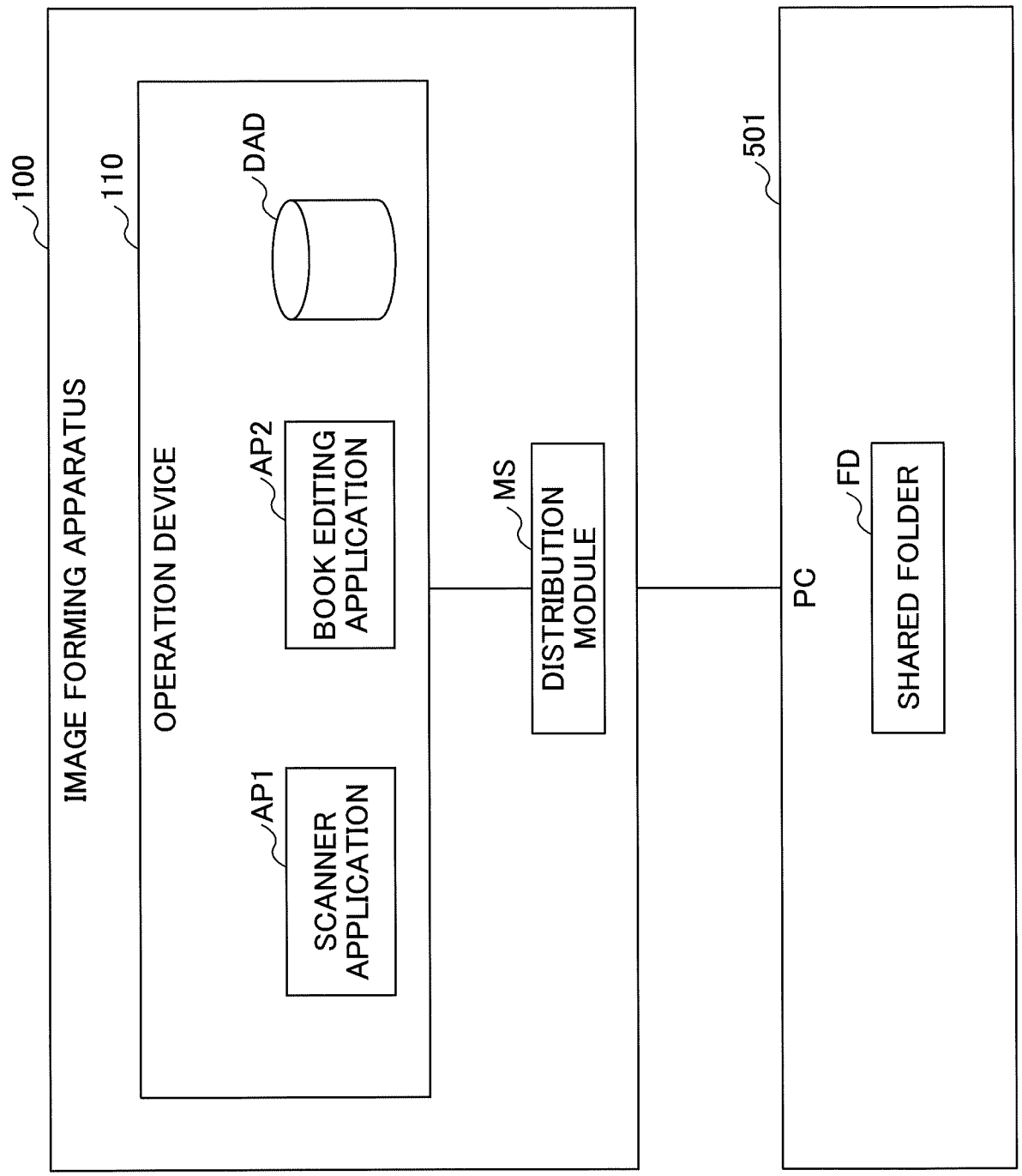
FIG. 6 is a block diagram illustrating an example of an application configuration.

FIG. 6 is a block diagram illustrating an example of an application configuration. For example, the scanner application AP1 and the address book editing application AP2 are pre-installed in the operation device 110.

Hereinafter, "Scan to Folder" (sometimes referred to as "S2F") is substantialized using an application as illustrated in the figure. Specifically, in S2F, the image formed on the paper is read by the scanner provided by the image forming apparatus 100, and image data is generated. Thereafter, the generated image data is transmitted to an area such as a folder preset in the connected information processing device (hereinafter referred to as "shared folder FD"). As described above, S2F is a service for data conversion and sharing of an image formed on a paper.

Scanner application AP1 is an application for scanning in S2F. Accordingly, the scanner application AP1 generates image data by controlling a reading device such as a scanner. When the image data is generated, the scanner application AP1 requests the distribution module to transmit the image data. The scanner application AP1 may also display an operation screen that accepts settings (for example, resolution) related to the scanner. On the other hand, the setting of the scanner is set by the initial setting or the like, and the configuration in which the scanner application AP1 reads out the setting may be used.

The address book editing application AP2 is an example of an application used to edit address book data DAD. In this example, the distribution module MS reads in the address book data DAD to identify the destination for transmitting the image data. The address book data DAD may be stored in an external device or the like. Then, the address previously registered in the address book data DAD is specified as the transmission destination.

On the other hand, the address book editing application AP2 displays an operation screen for performing an operation to input or change a numerical value representing an address. The address is not limited to an IP (Internet Protocol) address, etc., but may be a path, folder name, computer name, or a combination thereof. In addition, the destination is configured to request an ID (identification) and a password to allow access from a security standpoint. In such a case, the ID and password may be input in association with the address.

For example, the address book may be a data structure such as the following.

TABLE 1

| ID | USER NAME | PROTOCOL | PATH NAME | LOGIN USER NAME | LOGIN PASSWORD | MAIL ADDRESS SETTING INFORMATION | |
| --- | --- | --- | --- | --- | --- | --- | --- |
| 4 | USER A | SMB | ¥¥aa ¥folderA | aaaaaa | ******** | . . . . . . | . . . |
| 5 | USER B | SMB | ¥¥bb ¥folderB | bbbbbb | ******** | | |

In the address book illustrated in Table 1 above, each user has an "ID" that serves as identification information.

Then, the "ID" is input with a "user name," a "protocol" used for transmission, a "pathname" used as the address of the shared folder, a "login name" used for access, and a "login password name" used for access. As illustrated in the figure, the "mail address setting information" or the like may be entered in the address book.

The data structure of the address book is not limited to the configuration illustrated in Table 1 above. Accordingly, additional items other than those illustrated may be included.

The distribution module MS transmits and receives the connected information processing device and data via the network. Address book data DAD is read when transmitting the data. The distribution module MS transmits data to the shared folder FD, for example, using the SMB (Server Message Block) protocol or the like, for example.

The configuration of the application is not limited to the configuration illustrated in the figure. For example, the application may be installed on the main body unit of the image forming apparatus. Applications are not limited to one software. That is, the application may have a configuration in which a plurality of software, information processing devices, modules, and the like work together to substantialize a single processing. Further, the data such as the address book may not be stored by the image forming apparatus. That is, the data is provided by the external device, and the image forming apparatus or the like may be configured to access the data when used via the network.

The address may also be entered by default or the like. That is, the image forming apparatus 100 may have an initial setting module or the like, and may have a configuration in which an address is stored or acquired by the initial setting module or the like.

<Example of Overall Processing>

Figure 7:
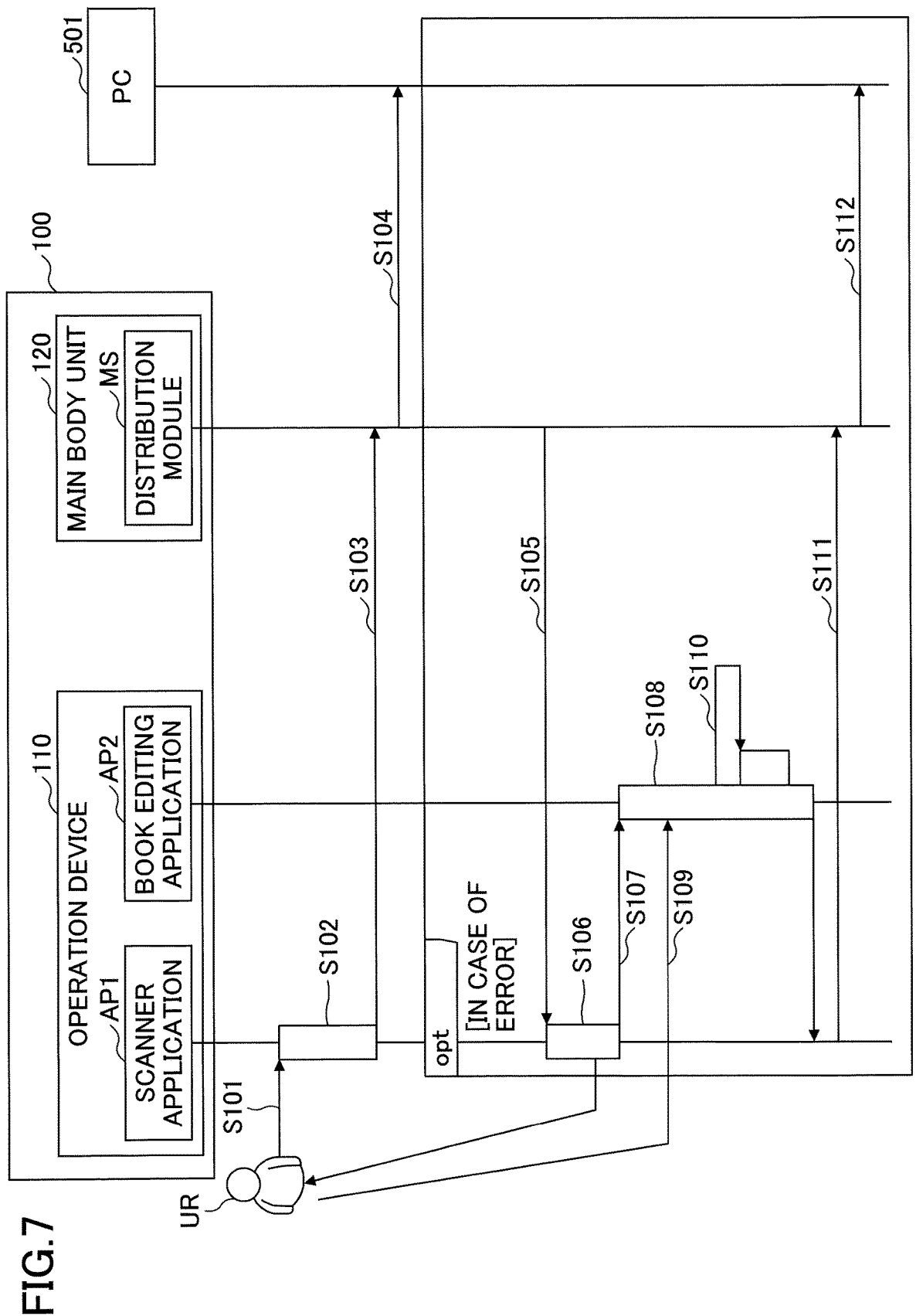
FIG. 7 is a sequence diagram illustrating an example of the overall processing according to the first embodiment.

FIG. 7 is a sequence diagram illustrating an example of the overall processing according to the first embodiment. For example, when the first application is designated as the scanner application AP1 and the second application is designated as the address book editing application AP2, the image forming apparatus 100 performs the following processing. Example of address input (step S101)

In step S101, the scanner application AP1 receives an operation to input an address by the user UR. That is, the user UR performs an operation to input information that can identify the shared folder of the PC 501 that is the transmission destination in the S2F. In addition, for the operation of inputting an address, the address registered in the address book may be selected, or a numeric value or a character that is an address may be entered directly.
Example of Scanner Processing (Step S102)

In step S102, the scanner application AP1 performs scanner processing. That is, in this example, the scanner application AP1 performs scanner processing as a predetermined process. Specifically, when the scanner application AP1 is operated by the user UR, the scanner application AP1 starts the reading device and reads the image formed on the paper. The scanner application AP1 generates image data representing the read image.
Transmission Request Example (Step S103)

In step S103, the scanner application AP1 requests the distribution module MS to transmit image data. That is, the scanner application AP1 passes the image data as an example of the transmission data to the distribution module MS so as to transmit the image data to the transmission destination input in step S101. The scanner application AP1 requests the distribution module MS to transmit the passed image data to the PC 501, which is an example of a transmission destination. Example of transmission data transmission (step S104)

In step S104, the distribution module MS transmits the transmission data to the transmission destination. For example, the distribution module MS uses the SMB protocol to transmit image data to the PC 501.

The above described processing of Step S101 through Step S103 is performed by, for example, the following operation screen.

Figure 8:
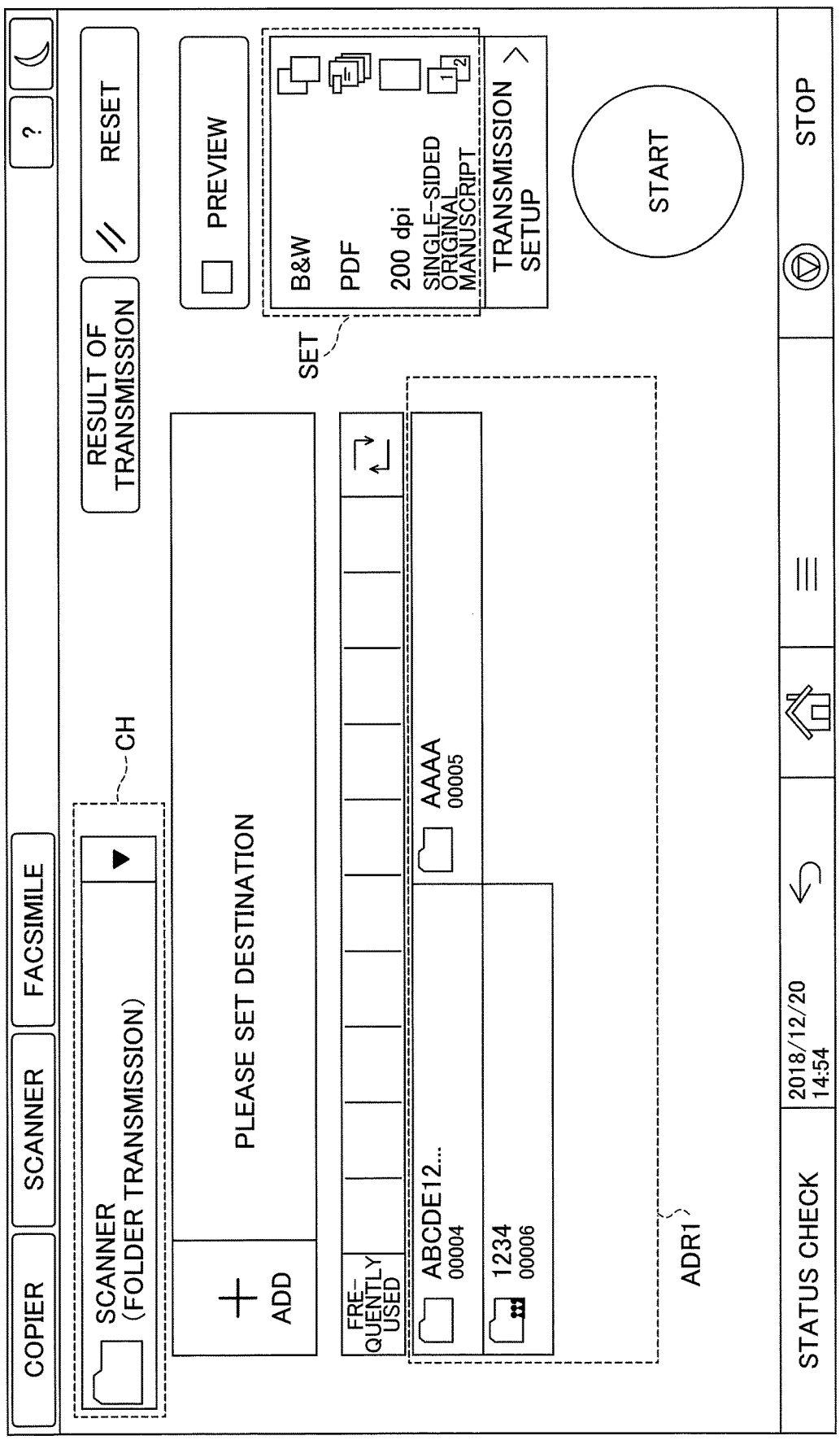
FIG. 8 is a diagram illustrating an operation screen example for the first application.

FIG. 8 is a diagram illustrating an operation screen example for the first application. For example, the user performs an operation related to the S2F for the operation screen illustrated in the figure.

Specifically, the application selection button CH selects the application to be used. As illustrated in the figure, when "Scanner (Send folder)" is selected, the application for executing S2F starts.

An address display ADR1 illustrates the address read from the address book. Then, the user performs an operation of selecting an address to be sent from the address display ADR1.

Condition setting SET sets the conditions for scanner processing. The illustrative example is conditions for setting a selection of black and white or color, a file format, a resolution, and single-sided or double-sided. The conditions that can be set by the condition setting SET differ depending on the application.

In this example, when the "Start" button is depressed, the conditions are fixed. Then, the S2F is started and the image data is transmitted to the transmission destination as transmission data (step S104).

Thereafter, the distribution module MS determines whether the transmission data was transmitted to the transmission destination. First, when the transmission data can be transmitted to the transmission destination, that is, when the transmission data can be successfully transmitted, the image forming apparatus ends the overall processing.

On the other hand, when the transmission data cannot be transmitted to the transmission destination, the image forming apparatus detects it as an error. For example, such an error is detected in the following cases.

(Examples of Causes of Errors)
 Server connection error
 Authentication error
 Folder connection error
 Authorization error
 Out-of-memory error
 Other errors (e.g. disconnection of network)

That is, the image forming apparatus detects the error based on the detection of the above-described state or the transmission result of the transmission data. For example, the cause described above may be identified by codes or the like output by the SMB protocol. The cause may be identified by detection by an operation device, another application, or a sensor. When such an error is detected (in the case of an error in the figure), the image forming apparatus proceeds to step S105.

Error Detection Notification (Step S105)

In step S105, the distribution module MS notifies of an error detection. The data indicating the cause of the error may be notified together.

Example of Error Screen Display (Step S106)

In step S106, the scanner application AP1 displays an error screen. For example, the scanner application AP1 displays the following error screen.

Figure 9:
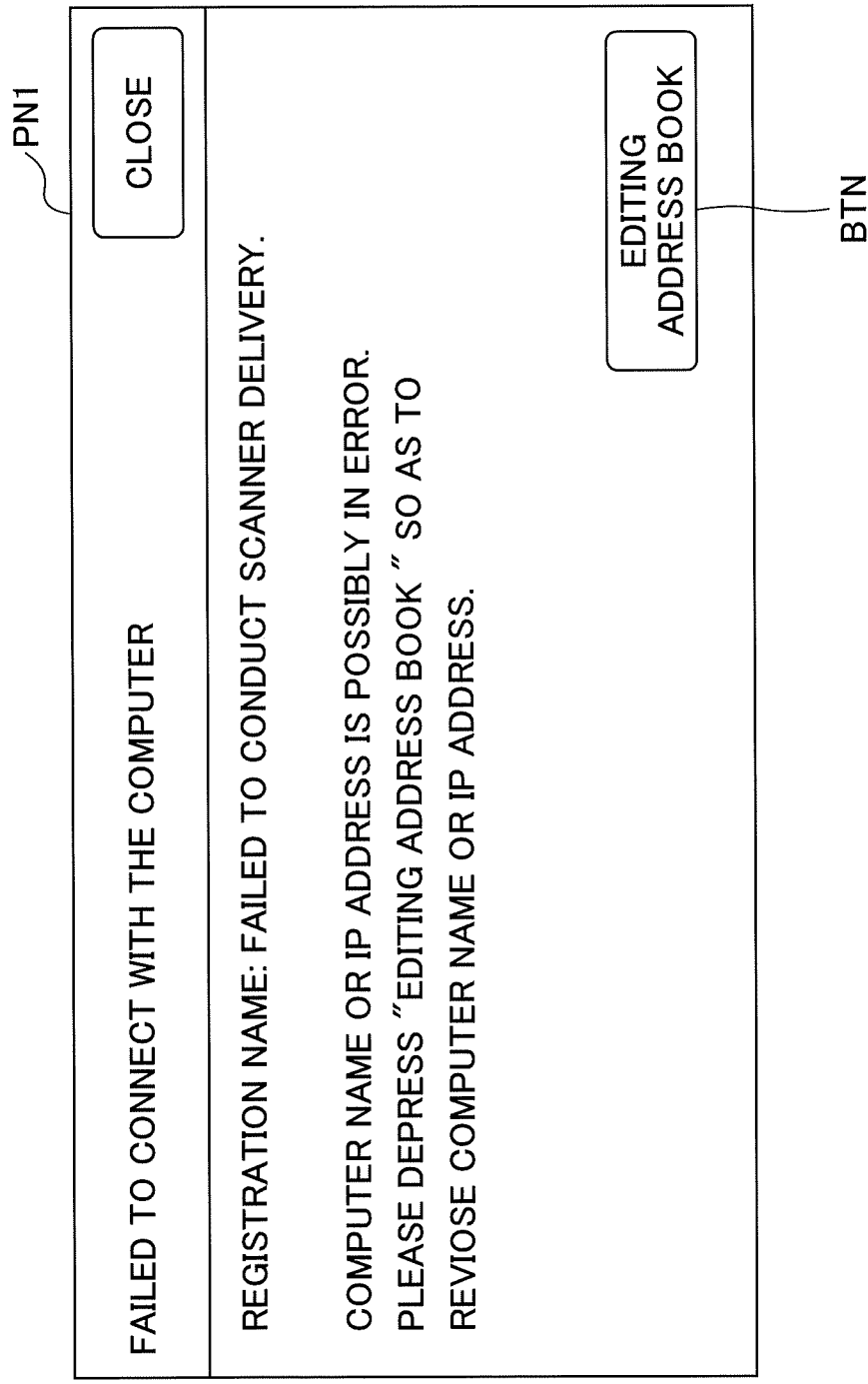
FIG. 9 is a diagram illustrating an example of an error screen.

FIG. 9 is a diagram illustrating an example of an error screen display. For example, the error screen PN1 is displayed by the operation device.

At first, the error screen PN1 indicates the error status and the cause of error. Incidentally, the content illustrated on the error screen PN1 may be grasped by the content notified in step S105.

Hereinafter, as illustrated in the error screen PN1, an example will be described in which an IP address representing the PC 501 entered in advance in the address book is incorrect and caused by an error. For example, if an attempt is made to access the IP address entered in the address book, such an error may occur if the corresponding computer does not exist or if the IP address of the PC 501 has been changed, but the address book has not been updated in association with the change.

The contents displayed on the error screen PN1 and the GUI (Graphical User Interface) depend on the contents of the error.

In the example illustrated in the figure, when the button BTN is depressed, the address book editing application AP2, which is an example of the second application used for the operation to eliminate errors, is started. Accordingly, in step S106, the error screen PN1 receives an operation of pressing the button BTN. When the button BTN is depressed, the image forming apparatus advances to step S107.

Example of Error Data Transmission and Startup of the Second Application (Step S107)

In step S107, the scanner application AP1 transmits error data to the address book editing application AP2 and starts the address book editing application AP2.

The error data is generated based on the contents of an error occurring in the scanner application AP1.

That is, the error data is data indicating, for example, the content, the type, the cause, or a combination thereof.

Specifically, if the type of OS is Android (registered trademark), etc., a plurality of applications can be started. For example, using the "Intent" function (hereinafter simply referred to as "Intent") by the OS, by specifying application identification information such as the application name and product ID of the destination application, one application can be started from the other application via the OS. In addition, using "Intent", the data and the like used in one application can be passed to the other application via the OS. For example, "Intent" can be used to specify a new application to be started via the OS, i.e., the action of the second application and the data to be passed from the first application to the second application via the OS.

Accordingly, it is desirable that the error data include the data utilized to use "Intent". For example, the error data preferably includes at least data that can identify the type of second application. Specifically, an identification number, etc. is set in advance for the address book editing application AP2. That is, if the identification number representing the address book editing application AP2 is known, the target application type is specified as the address book editing application AP2. As described above, if the error data includes data that can identify the type of the second application, such as the identification number, it is possible to identify and start the appropriate application for the error.

It is also desirable that the error data include data that can identify the operation screen. In the second application, it is often possible to display multiple operation screens. When performing an operation to eliminate an error, it is preferable to display an operation screen suitable for performing an operation to eliminate an error out of the operation screens on which the second application can display. Accordingly, it is preferable that the error data include an identification number, etc. of the operation screen, which can identify the operation screen suitable for performing the operation to eliminate the error. Furthermore, when transmitting and receiving error data, it is preferable to use an OS-based configuration, such as "Intent". With such a configuration, the contents of errors can be shared between multiple applications, i.e., between different applications.

For example, when the second application starts, the following operation screen may be displayed.

Example of the Operation Screen (Step S108)

In step S108, the address book editing application AP2 displays an operation screen. Specifically, the address book editing application AP2 displays the following operation screen based on the error data.

FIG. 10 is a diagram illustrating an example (first) of the operation screen. For example, the destination operation screen PN2 is displayed in step S108 as illustrated.

The destination operation screen PN2, for example, displays a "path name" as an example of an item for which an address representing a transmission destination is set.

For example, as described above, when it is judged that the error is caused by the address indicating the transmission destination being incorrect, the destination operation screen PN2 is displayed. On the other hand, for example, when an authentication error occurs, the address book editing application AP2 displays the following operation screen based on the error data.

FIG. 11 is a diagram illustrating an example (Part 2) of the operation screen. For example, in step S108, the authentication operation screen PN3 as illustrated is displayed.

For example, an authentication error may be caused by, for example, an error in entering the ID or password. Accordingly, the authentication operation screen PN3 is an operation screen for manipulating data used for authentication such as ID or password.

The authentication operation screen PN3 displays the "login user name" as an example of the item indicating the ID. In addition, the authentication operation screen PN3 displays "login password" as an example of an item indicating the password.

In addition, the settings can be changed so that the transmission initial user name and password set in the initial setting application AP3 are used without using the login user name and login password set for each user as the folder authentication information.

In some cases, as illustrated in FIGS. 10 and 11, a screen configuration includes a destination system operation screen for setting the transmission destination and an authentication system operation screen for setting the authentication. The destination-system operation screen and the authentication-based operation screen may be a screen configuration that exists separately in one window and is switched by scrolling, or may be a screen configuration that becomes a separate window.

For example, when there is a destination-based operation screen and an authentication-based operation screen, the error data preferably includes identification information of the destination-based operation screen or the authentication-based operation screen.

The error data preferably include information identifying the address book. The address book is often different for each user, i.e., there are multiple address books. Thus, the error data preferably includes data specifying the address book to be used by the second application. The data used by the second application may not be in the address book. Even in such a case, there may be more than one data used by the second application. Therefore, it is preferable that the error data include identification information that identifies the data to be used so that the second application can know which data to use based on the contents of the error.

On the operation screen, it is preferable to highlight items that cause errors. For example, if the "path name" setting is incorrect, it is desirable that the "path name" be highlighted by color coding, flashing, graying out, other decorations, or a combination thereof. As described above, when the portion to be corrected is emphasized, the user can easily understand the portion to be operated.

In addition, the items may be corrected and displayed on the operation screen. For example, if the "path name" setting is incorrect, the operation screen is displayed by searching the network and correcting it to an IP address indicating a computer having an address close to the numeric value or a computer having a name similar to the incorrectly entered computer name. In other words, the operation screen displays addresses that are presumed to be correct. Thus, when an item is corrected, the user may omit the operation to make the correction.

Alternatively, item correction candidates may be displayed on the operation screen. For example, if the "path name" setting is incorrect, it is preferable that a list of computers that can be searched and accessed on the network be displayed as a correction candidate on the operation screen. Then, an operation of selecting one computer from the list is performed, and the address stored in the address book is modified so that the address is replaced with the address of the correction candidate. The display method of correction candidates may be set beforehand. As described above, when a correction candidate of an item is displayed, the user can reduce the amount of time required for searching for the correct computer.

In the operation screen, it may be possible to check whether data can be transmitted to the modified destination.

In addition, when an item is corrected, it is desirable to notify the application installed in the image forming apparatus or the operation device. For example, when data that is likely to be used in multiple applications is changed, such as in an address book, it is desirable to notify that the correction is made.

It is highly likely that various applications refer to data used in various applications, such as address books. Therefore, when modified, it is desirable for the application to update the data referred from the address book or access the modified address book to use the modified data. Thus, when a modification is notified, the modification of the address can be reflected in other applications as well.

As described above, when highlighting items that cause errors, correcting items, or displaying correction candidates for items, it is desirable that data identifying the target item be further sent from the first application to the second application.

Example of Error Correction Operation Input (Step S109)

In step S109, the address book editing application AP2 inputs an operation to correct the error. Said differently, the address book editing application AP2 displays the operation screen illustrated in FIG. 10 or FIG. 11 and receives an operation to input a so-called "correct" address that can transmit the transmission data and an operation to depress the "OK" button.

Example of Address Book Update (Step S110)

In step S110, the address book editing application AP2 updates the address book in response to the receipt of the depressing operation of the "OK" button. That is, the address book editing application AP2 replaces the original incorrect address with an address or the like input in step S109. When the update is completed, the completion is notified to the scanner application AP1. On the other hand, the address book editing application AP2 starts the scanner application using "Intent" without updating the address book, in response to receiving the depressing operation of the "Cancel" button.

Specifically, the address book editing application AP2 creates "Intent" including the identification information of the scanner application AP1. In this manner, the address book editing application AP2 starts the scanner application AP1 via the OS. The address book editing application AP2 uses "Intent" to pass an instruction to the scanner application to execute the transmission of information or image data indicating that the incorrect address is updated again. The scanner application AP1 executes the process according to the passed information.

When the address book editing application AP2 is started up from the scanner application AP1, it retains the identification information of the scanner application AP1 that is starting up and determines the application to be started up based on the identification information retained in the input operation of the "correct" address.

Example of Re-Execution Request (Step S111)

In step S111, the scanner application AP1 requests the distribution module MS to execute the transmission of the image data again. That is, the scanner application AP1 requests the distribution module MS to transmit the image data in the updated address book.

Example of Transmitting Transmission Data (Step S112)

In step S112, the distribution module MS transmits the transmission data to the transmission destination. For example, the distribution module MS performs the same operation as in step S104. However, the address used for transmission is the address after revision The subsequent processing is similar to, for example, step S104.

When the address book is set to use the transmission initial user name and password set by the initial setting application AP3, the scanner application AP1 may activate the initial setting application AP3 without starting the address book application using "Intent" and display the setting screen of the transmission initial user name and password.

Figure 12:
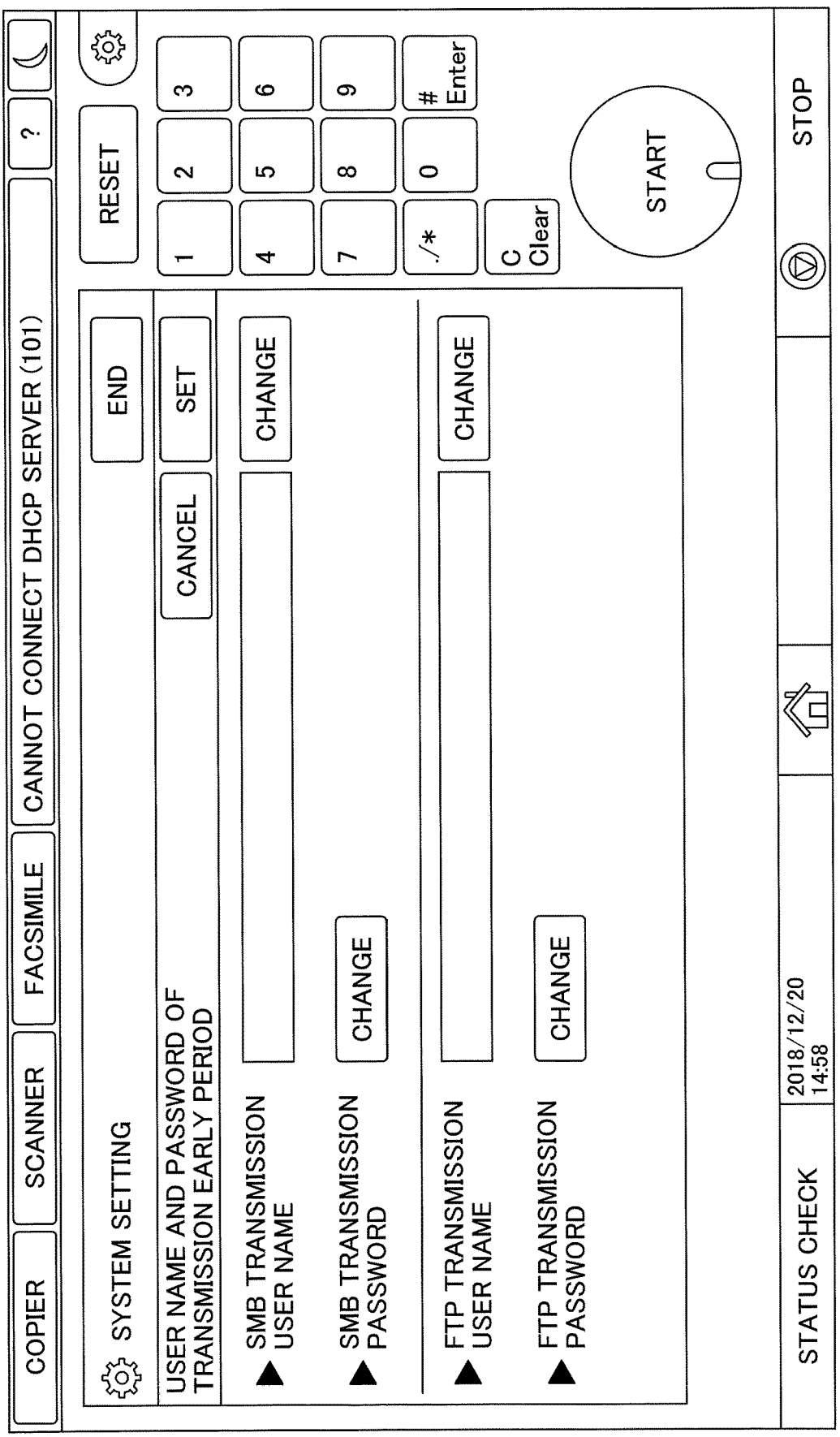
FIG. 12 is a diagram illustrating a display example of a setting screen of a user name and password of a transmission early period displayed by an initial setting application.

FIG. 12 is a diagram illustrating a display example of a setting screen for setting the user name and password of the transmission early period. In the illustrated example, the "SMB transmission user name" and the "FTP transmission user name" are set to a character or a numeric value indicating an ID. On the other hand, the "SMB transmission password" and the "FTP transmission password" are set to a character or a numeric value indicating the password. For, example, if the ID or password is incorrect, the operation screen illustrated in the figure is displayed.

Second Embodiment

In the second embodiment, for example, the overall configuration and the hardware configuration similar to the first embodiment are used. Hereinafter, different points are mainly explained.

The second embodiment differs in that the target service is "Scan to Mail" (hereinafter, referred to as "S2 Mail"). That is, image data generated by scanner reading is attached to mail and sent to the destination indicated by the address. In the case of S2 mail, the overall processing is performed as follows, for example.

<Example of Overall Processing>

Figure 13:
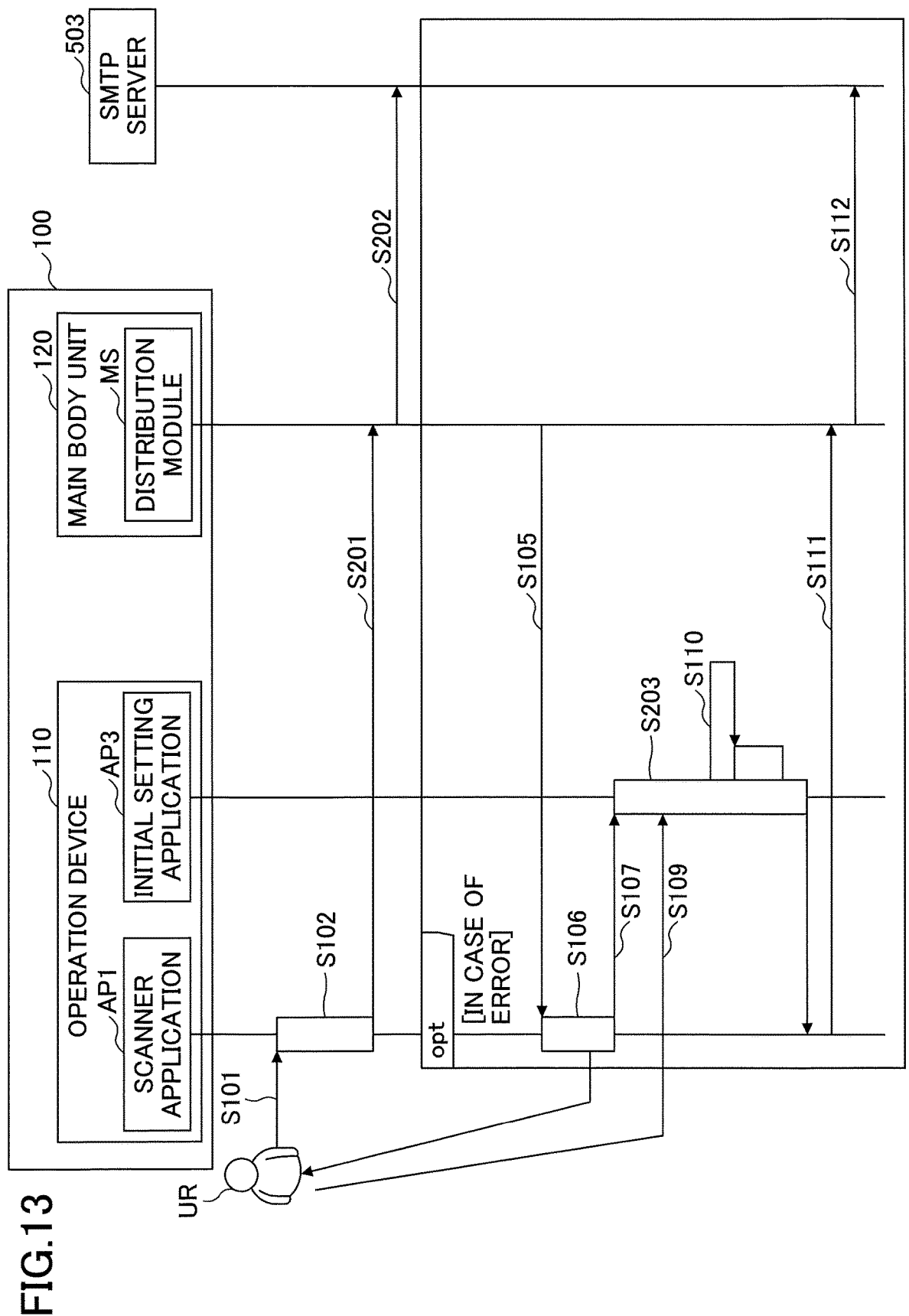
FIG. 13 is a sequence diagram illustrating an example of the overall processing in the second embodiment.

FIG. 13 is a sequence diagram illustrating an example of the overall processing according to the second embodiment. As illustrated in the figures, when compared to the first embodiment, the destination is the SMTP (Simple Mail Transfer Protocol) server (hereinafter, referred to as the "SMTP server 503"). In addition, the second application AP3 is the default application.

Accordingly, in S2 mail, the SMTP server 503 transmits the sent mail (i.e., the mail with image data attached thereto) to the address entered.

Example of Mail Transmission Request (Step S201)

In step S201, the scanner application AP1 requests the distribution module MS to transmit an e-mail with image data attached to. That is, the scanner application AP1 passes the data of the mail with the image data as an example of the transmission data to the distribution module MS so as to transmission the mail with the image data attached to the transmission destination input in step S101. The scanner application AP1 requests the distribution module MS to transmission the passed mail to the SMTP server 503, which is an example of the transmission destination.

Example of Mail Transmission (Step S202)

In step S202, the distribution module MS transmits a mail to the destination.

The above processings of step S101, step S102, step S201, and step S202 are performed in the following operation screen, for example.

Figure 14:
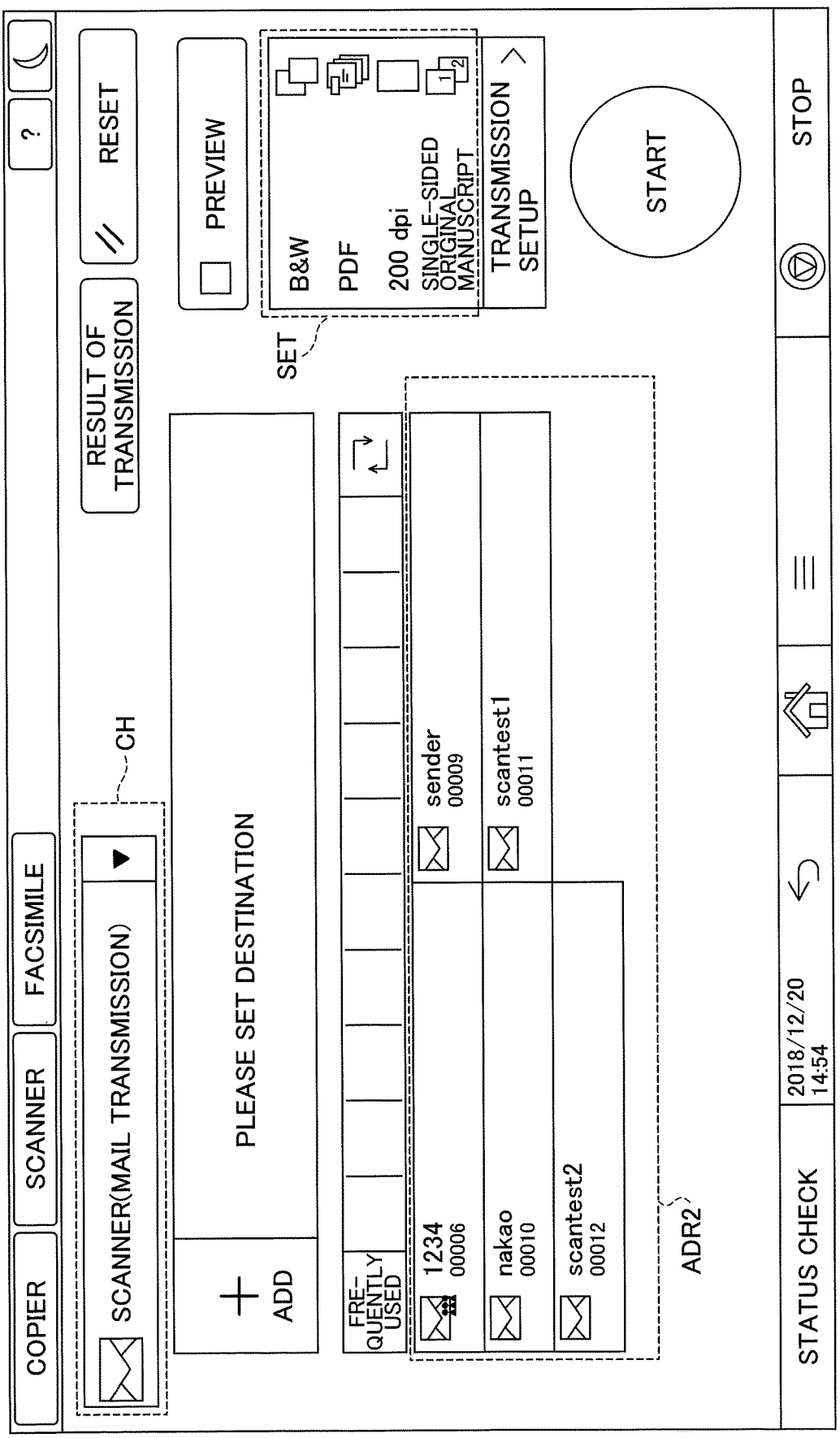
FIG. 14 is a diagram illustrating an operation screen example for the first application according to the second embodiment.

FIG. 14 is a diagram illustrating an operation screen example for the first application according to the second embodiment. For example, when "Scanner (mail transmission)" is selected by the application selection button CH, the operation screen for setting S2 mail as illustrated in the figure is displayed.

In the example illustrated in the figure, as in S2F, the conditions of the scanner processing are set by the condition setting SET.

In a manner similar to S2F, the transmission destination is selected from the address display ADR2 read from the address book.

In a manner similar to the first embodiment, when the image data generated by the scanner processing cannot be transmitted, the processing in step S105 or later is performed. In comparison with the first embodiment, the contents of the error are different, so the items to be corrected are different.

In the second embodiment, the error has the following causes, for example.

Error in which the IP address of the configured SMTP server does not exist

In the above example, the case occurs when the IP address is incorrect in the setting of the SMTP server, etc. Hereinafter, it is assumed that the SMTP server is set by default. In this case, in step S107, the scanner application AP1 starts the initial setting application AP3 using "Intent" and passes the error data to the initial setting application AP3. Example of displaying an operation screen for performing initial setting (step S203)

In step S203, the initial setting application AP3 displays an operation screen for performing the initial setting. For example, the initial setting application AP3 displays the following operation screen.

Figure 15:
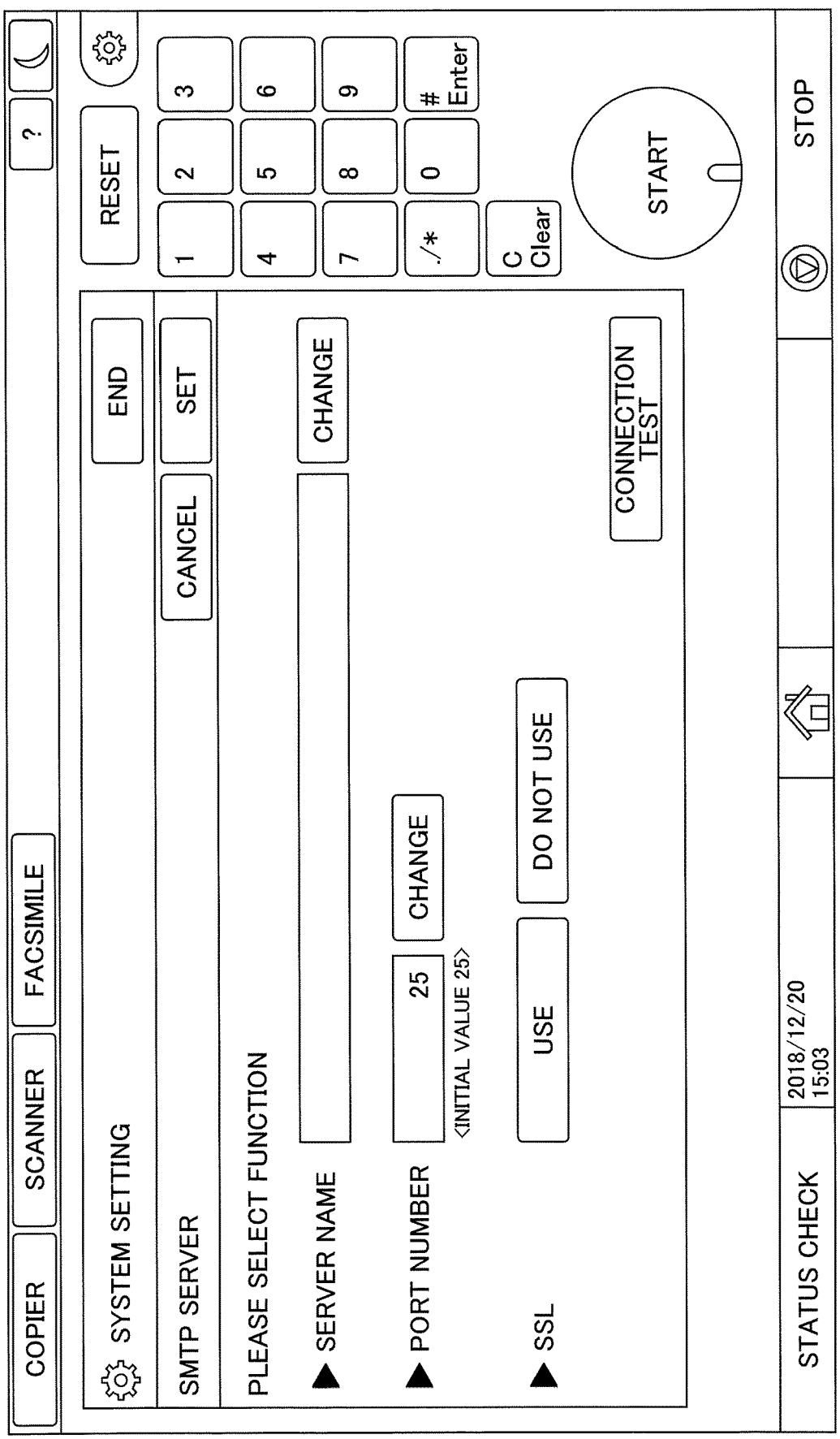
FIG. 15 is a diagram illustrating a display example of an operation screen according to the second embodiment.

FIG. 15 is a diagram illustrating a display example of an operation screen according to the second embodiment. For example, an IP address is set to the item "Server name" in the operation screen illustrated in the figure. Accordingly, if it is determined that the IP address is incorrect, the user is instructed to modify the "server name" by displaying a screen as illustrated in the figure.

The settings for the SMTP server are as follows.

TABLE 2

| SERVER NAME | PORT NUMBER | USE OF SSL | USER NAME | PASSWORD |
|---|---|---|---|---|
| 111.222.333.444 | 25 | FALSE | user1 | ******** |

Table 2 above illustrates an example in which an IP address is input in the "server name". Other settings include the "port number" used for communication, the "SSL use" which is the setting of whether to use SSL (Secure Sockets Layer), and the "username" and the "password" which indicate the ID and password when using SMTP.

The setting is not limited to the setting illustrated in Table 2 above, but may include other settings.

In the above example, it is preferable that the screen illustrated in FIGS. 12 and 15, etc. be identified by the intensive function by the error data transmitted from the first application to the second application, based on whether the error is caused by the setting of the address, etc. for using the SMTP server or by whether the ID and password for using the SMTP server are the cause of the error, that is, the operation screen setting information is included. As described above, the operation screen used differs depending on the cause of the error, so that when the appropriate operation screen for the cause of the error is displayed, the user can reduce the workload.

When the setting of the SMTP server 503 is performed by, for example, an initial setting, the second application type started in step S107 is an initial setting application or the like. On the other hand, when the address to be entered into the address book is incorrect, the second application type started in step S107 is the address book application or the like as in the first embodiment. However, in this case, since the mail address is the target item, an operation screen illustrating the page, etc. of the address book corresponding to the transmission destination user is displayed. With such a configuration, it is possible to reduce the amount of time required for a user to search for and start an application to modify the settings.

<Example of Function Configuration>

Figure 16:
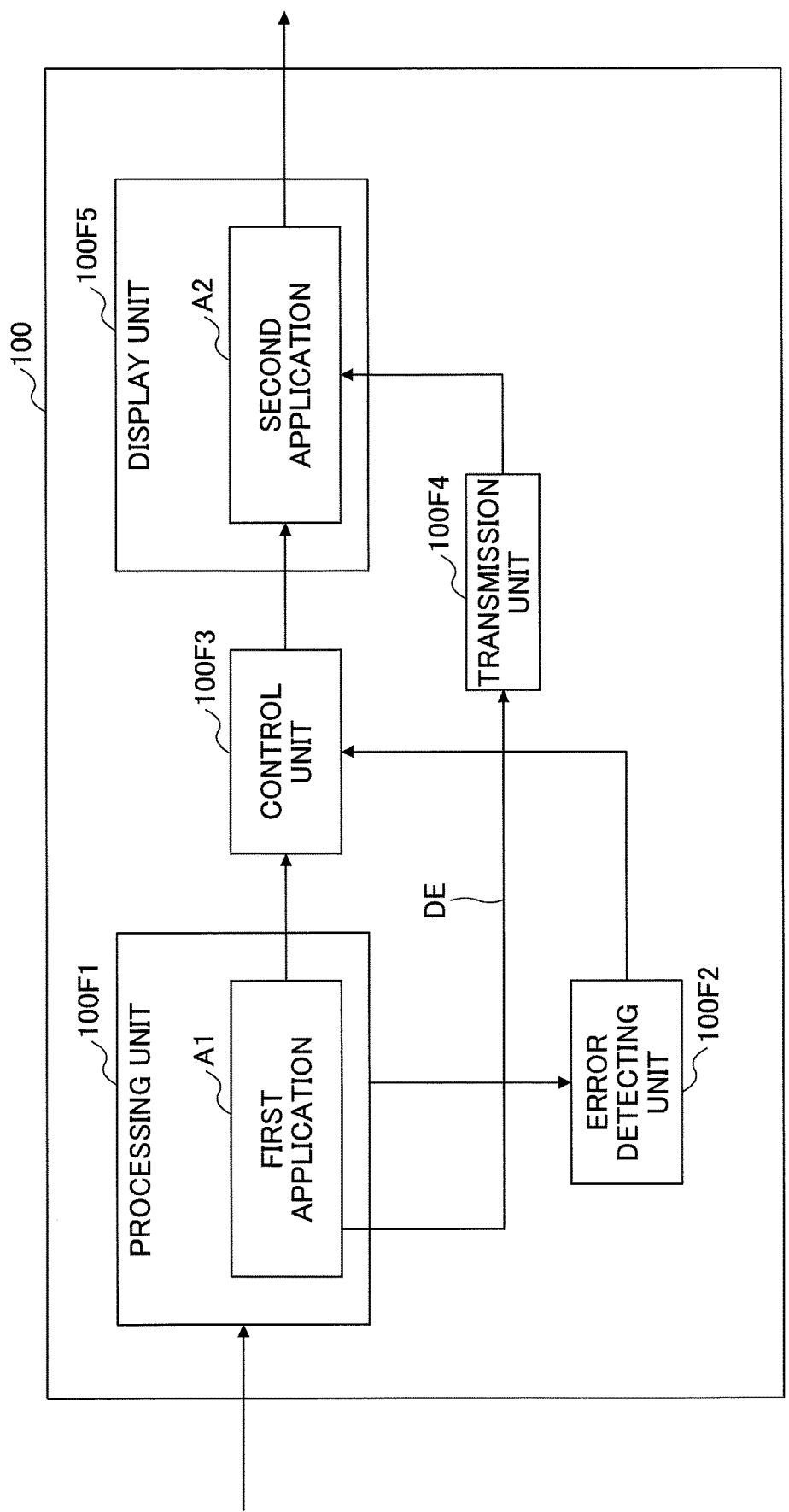
FIG. 16 is a functional block diagram illustrating an exemplary functional configuration of an image forming apparatus.

FIG. 16 is a functional block diagram illustrating an exemplary functional configuration of the image forming apparatus. For example, the image forming apparatus 100 has a functional structure including a processing unit 100F1, an error detecting unit 100F2, a control unit 100F3, a transmission unit 100F4, and a display unit 100F5.

The processing unit 100F1 performs the processing procedure in which the predetermined processing is performed by the first application A1 in the image forming apparatus 100 or the operation device 110. For example, the processing unit 100F1 is substantialized by a CPU 211, a CPU 221, or the like.

The error detecting unit 100F2 performs the error detecting procedure for detecting an error in the processing by the first application A1. For example, the error detecting unit 100F2 is substantialized by the CPU 211, the CPU 221, or the like.

When an error is detected by the error detecting unit 100F2, the control unit 100F3 performs a control procedure to start the second application A2 for performing an operation to eliminate the error. For example, the control unit 100F3 is substantialized by the CPU 211, the CPU 221, or the like.

The transmission unit 100F4 performs the transmission procedure in which the error data DE based on the error content is transmitted from the first application A1 to the second application A2. For example, the transmission unit 100F4 is substantialized by a CPU 211, a CPU 221, or the like.

The display unit 100F5 performs a display procedure for displaying the operation screen of the second application A2 based on the error data DE. For example, the display unit 100F5 is substantialized by the operation panel 215 or the like.

By installing an application in the image forming apparatus 100 or the operation device 110, the image forming apparatus 100 or the operation device 110 can perform various processes. However, even if an error occurs in an application, the cause of the error may not be an application where the error has occurred and may not be correctable unless the application is another application.

When an error occurs, simply displaying an error message may not allow the user to know what kind of action can be taken to resolve the error, what the cause of the error is, or which specific application can be used to resolve the error. In such a case, it is often troublesome for the user to check by referring to help, etc. with error messages, etc.

In addition, even if an error is known, in order to move to the operation screen of the application for eliminating the error, it is often troublesome to go back to the so-called "home" screen to reach the operation screen.

On the other hand, if the functional configuration is as illustrated in the figure, the image forming apparatus switches from the first application A1 as the switching source at which an error occurs to the second application A2 as the switching destination at which an error is resolved based on the contents of the error, that is, the error data. Accordingly, the user can reduce the workload of performing the operation of starting the second application.

Further, from the first application A1 to the second application, an operation screen suitable for performing an operation to resolve the error based on the error is selected, and identification information or the like of the selected operation screen is transmitted as the error data. In this way, the second application can display the appropriate operation screen. Therefore, in order to display the operation screen for the operation to eliminate the error, it is possible to reduce the operation to shift the screen from the "home" to the operation screen.

Thus, the user's effort can be reduced in the event of the error.

Other Embodiments

Incidentally, all or part of each process according to the present invention is described in a low-level language or a high-level language, and may be implemented by a program for having a computer execute an information processing method. That is, the program is a computer program for causing a computer such as an image forming apparatus or an image forming system to execute each process.

Accordingly, when the information processing method is executed based on the program, the computing device and the operation device of the computer perform calculations and control based on the program for executing each process. The memory device of the computer stores the data used for the processing based on the program in order to execute each process.

The program can be recorded and distributed on a computer-readable recording medium. The recording medium may be a medium such as a magnetic tape, a flash memory, an optical disk, an optical magnetic disk, or a magnetic disk. In addition, the program may be distributed over an electric telecommunication line.

The embodiments according to the present invention may be implemented by the image forming system. The image forming system may perform each process by redundancy, dispersion, parallelism, virtualization, or a combination thereof.

Although an example in the embodiment has been described, the present invention is not limited to the above-described embodiment. That is, various modifications and alternations are possible within the scope of the present invention.

Embodiments of the present invention reduce a user's workload in a case where an error occurs.

EXPLANATION OF REFERENCE SYMBOLS

100: image forming apparatus
110: operation device
500: image forming system
100F1: processing unit
100F2: error detection unit
100F3: control
100F4: transmission unit
100F5: display
DE: error data

What is claimed is:

1. An image forming apparatus comprising:
a main body unit including circuitry that implements one or more of a copy function, a scanner function, a facsimile function, or a printer function performed by the image forming apparatus,
an operation terminal that is communicably connected to the main body unit and that receives an operation to the image forming apparatus, the operational terminal including
a processor;
a memory storing program instructions that cause the processor to:
perform a predetermined processing by a first application in the image forming apparatus or the operation terminal, wherein the first application transmits transmission data to a transmission destination,
detect a failure in transmitting the transmission data as an occurrence of an error in the processing by the first application,
start up a second application to resolve the error upon detecting the occurrence of the error, and
transmit error data formed based on contents of the error from the first application to the second application, the error data including identification information specifying a transmission destination database to be used by the second application; and
a display panel on which an operation screen of the second application is displayed based on the error data, wherein
the operation terminal is controlled by a first operating system and the main body unit is controlled by a second operating system, and
the first application and the second application are installed in the operation terminal.

2. The image forming apparatus according to claim 1, wherein
the error data includes data specifying a type of the second application and the operation screen.

3. The image forming apparatus according to claim 1, wherein
the display panel displays an item causing the error by highlighting the item after revision of the item, or a candidate of revising the item.

4. The image forming apparatus according to claim 1, wherein
when an item causing the error is revised in the operation screen, the operation screen reports the revision to all applications installed in the main body unit or the operation terminal that access the specified transmission destination database.

5. The image forming apparatus according to claim 1, wherein
the operation screen is a screen for editing an address representing the transmission destination.

6. The image forming apparatus according to claim 1, wherein
the operation terminal starts up a plurality of applications, and
the first application transmits the error data to the second application via the first operating system.

7. An information processing method performed by an image forming apparatus that includes an operation terminal that receives an operation for the image forming apparatus, and a main body unit that is communicably connected to the operation terminal, the operation terminal and the main body unit being controlled by different operating systems, the information processing method comprising:
performing a predetermined processing by the image forming apparatus using a first application provided in the operation terminal or the main body unit, wherein the first application transmits data to a transmission destination;
detecting a failure in transmitting the transmission data as an occurrence of an error in processing using the first application;
starting up a second application to resolve the error upon detecting the occurrence of the error;
transmitting error data based on contents of the error from the first application to the second application by the image forming apparatus, the error data including identification information specifying a transmission destination database to be used by the second application; and
displaying an operation screen of the second application based on the error data.

8. The information processing method according to claim 7, wherein
the error data includes data specifying a type of the second application and the operation screen.

9. The information processing method according to claim 7, wherein
an item causing the error is displayed by highlighting the item after revision of the item, or a candidate of revising the item.

10. The information processing method according to claim 7, wherein
when an item causing the error is revised in the operation screen, the operation screen reports the revision to all applications installed in the main body unit or the operation terminal that access the specified transmission destination database.

11. The information processing method according to claim 7, wherein
the operation screen is a screen for editing an address representing the transmission destination.

12. The information processing method according to claim 7, wherein
the operation terminal starts up a plurality of applications, and
the plurality of applications receives the error data via an OS.

13. A non-transitory computer-readable storage medium storing a program for causing a computer to execute an information processing method as an image forming apparatus that includes an operation terminal that receives an operation for the image forming apparatus, and a main body unit that is communicably connected to the operation terminal, the operation terminal and the main body unit being controlled by different operating systems, the information processing method comprising:

performing a predetermined processing by the image forming apparatus using a first application provided in the operation terminal or the main body unit, wherein the first application transmits data to a transmission destination;

detecting a failure in transmitting the transmission data as an occurrence of an error in processing using the first application;

starting up a second application to resolve the error upon detecting the occurrence of the error;

transmitting error data based on contents of the error from the first application to the second application by the image forming apparatus, the error data including identification information specifying a transmission destination database to be used by the second application; and displaying an operation screen of the second application based on the error data.

14. The non-transitory computer-readable storage medium according to claim 13, wherein
the error data includes data specifying a type of the second application and the operation screen.

15. The non-transitory computer-readable storage medium according to claim 13, wherein
an item causing the error is displayed by highlighting the item after revision of the item, or a candidate of revising the item.

16. The non-transitory computer-readable storage medium according to claim 13, wherein
when an, item causing the error is revised in the operation screen, the operation screen reports the revision to all applications installed in the main body unit or the operation terminal that access the specified transmission destination database.

17. The non-transitory computer-readable storage medium according to claim 13, wherein
the first application is an application that transmits transmission data to a transmission destination,
the error is detected when the transmission data cannot be transmitted to the transmission destination, and
the operation screen is a screen for editing an address representing the transmission destination.

18. The non-transitory computer-readable storage medium according to claim 13, wherein
the operation terminal starts up a plurality of applications, and
the plurality of applications receives the error data via an OS.

* * * * *